United States Patent
Moreno

(10) Patent No.: US 11,877,212 B2
(45) Date of Patent: Jan. 16, 2024

(54) SYSTEM AND METHOD FOR DEVICE LOCATION

(71) Applicant: ARRIS ENTERPRISES LLC, Suwanee, GA (US)

(72) Inventor: Cesar Moreno, Santa Rosa Beach, FL (US)

(73) Assignee: ARRIS Enterprises LLC, Suwanee, GA (US)

( * ) Notice: Subject to any disclaimer, the term of this patent is extended or adjusted under 35 U.S.C. 154(b) by 261 days.

(21) Appl. No.: 17/522,135

(22) Filed: Nov. 9, 2021

(65) Prior Publication Data

US 2022/0210611 A1 Jun. 30, 2022

Related U.S. Application Data

(60) Provisional application No. 63/132,078, filed on Dec. 30, 2020.

(51) Int. Cl.
*H04W 4/00* (2018.01)
*H04W 4/029* (2018.01)
*H04W 4/80* (2018.01)

(52) U.S. Cl.
CPC ............ *H04W 4/029* (2018.02); *H04W 4/80* (2018.02)

(58) Field of Classification Search
CPC ............................... H04W 4/029; H04W 4/80
USPC ....................................................... 370/329
See application file for complete search history.

(56) References Cited

U.S. PATENT DOCUMENTS

| 9,538,332 | B1* | 1/2017 | Mendelson | H04W 48/10 |
| 11,632,659 | B2* | 4/2023 | Mesirow | G01S 5/0252 |
| | | | | 455/456.1 |
| 11,751,123 | B2* | 9/2023 | Breaux, III | H04W 48/04 |
| | | | | 381/86 |
| 2012/0129460 | A1* | 5/2012 | Hodis | G01S 5/011 |
| | | | | 455/67.11 |
| 2013/0298208 | A1* | 11/2013 | Ayed | H04L 27/00 |
| | | | | 375/259 |
| 2015/0099469 | A1* | 4/2015 | Goldstein | H04W 4/80 |
| | | | | 455/41.2 |
| 2015/0141043 | A1* | 5/2015 | Abramson | G01C 21/34 |
| | | | | 455/456.1 |
| 2016/0037306 | A1* | 2/2016 | Johnson | H04W 4/33 |
| | | | | 340/5.7 |
| 2016/0088440 | A1* | 3/2016 | Palanki | G01S 5/0249 |
| | | | | 455/456.1 |
| 2016/0205238 | A1* | 7/2016 | Abramson | H04W 4/029 |
| | | | | 455/456.4 |

(Continued)

OTHER PUBLICATIONS

Ishida et al, "Proposal of Separate Channel Fingerprinting using Bluetooth Low Energy", 2016 5th IIAI International Congress on Advanced Applied Informatics, pp. 230-233.

(Continued)

*Primary Examiner* — Marceau Milord
(74) *Attorney, Agent, or Firm* — Panitch Schwarze Belisario & Nadel LLC

(57) ABSTRACT

A system and method for utilizing a network of Bluetooth devices to determine approximate location of Bluetooth device that was lost or misplaced in vicinity of the network. The network can be constructed from low-energy Bluetooth devices that would otherwise be only periodically active and/or networked for a purpose other than the localization of lost or misplaced devices.

20 Claims, 8 Drawing Sheets

(56) References Cited

U.S. PATENT DOCUMENTS

| | | | | |
|---|---|---|---|---|
| 2016/0248748 | A1* | 8/2016 | Caterino | H04L 63/10 |
| 2017/0055128 | A1* | 2/2017 | Smith | G01S 19/48 |
| 2017/0164315 | A1* | 6/2017 | Smith | G01S 5/0284 |
| 2017/0164318 | A1* | 6/2017 | Smith | G01S 5/0289 |
| 2017/0208564 | A1 | 7/2017 | Lee et al. | |
| 2017/0303074 | A1* | 10/2017 | Lin | G01K 3/005 |
| 2018/0317044 | A1* | 11/2018 | Chen | G01S 5/02 |
| 2019/0149943 | A1* | 5/2019 | Ledvina | H04L 67/306 |
| | | | | 455/456.1 |
| 2019/0387385 | A1* | 12/2019 | Goldstein | H04W 4/21 |
| 2021/0021971 | A1* | 1/2021 | Mesirow | H04W 4/02 |
| 2021/0067938 | A1* | 3/2021 | Goldstein | H04L 67/54 |
| 2023/0096269 | A1* | 3/2023 | Goldstein | H04W 4/21 |
| | | | | 455/41.2 |
| 2023/0156569 | A1* | 5/2023 | Breaux, III | H04W 12/08 |
| | | | | 381/86 |

OTHER PUBLICATIONS

International Search Report and Written Opinion for Application No. PCT/US2021/058565 dated Feb. 4, 2022.

Ishida et al., "Proposal of Separate Channel Fingerprinting using Bluetooth Low Energy", 1-20 IEEE, 2016, retrieved on [Jan. 14, 2022]. Retrieved from the internet <URL:https://ieeexplore.ieee.org/stamp/stamp.jsp?tp=&arnumber-7557608> entire document.

* cited by examiner

Selected Device Location

| Set-Top Box | Device Location | Signal Strength |
|---|---|---|
| 110 | Southeast | 5 |
| 112 | Southeast | 8 |
| 114 | Southeast | 6 |

FIG. 2D

SYSTEM AND METHOD FOR DEVICE LOCATION

CROSS-REFERENCE TO RELATED APPLICATION

This application claims the benefit of U.S. Provisional Patent Application No. 63/132,078, filed Dec. 30, 2020, which is incorporated by reference herein in its entirety.

BACKGROUND OF THE INVENTION

In any given residential or business environment, it is not unusual to find a number of wireless devices, including devices conforming to Bluetooth Special Interest Group standards, including Bluetooth Low Energy ("BLE"), also known as Bluetooth 4.0. Unlike standard Bluetooth devices, which are designed to support frequent or continuous inter-device digital communication, BLE devices operate at a far lower power level (a BLE transponder can operate for many years on a single battery) and are designed primarily for environments and applications requiring periodic or infrequent communication of limited amounts of data. BLE applications include remote control interfaces, location sensing and inter-device communication for media gateway appliances ("MGAs") and digital set-top boxes, personal fitness trackers, proximity sensors, medical monitors, as well as geography/location-based advertising systems. Given the varied uses for BLE technology, it is highly likely that BLE devices will be integrated into more and more household systems and appliances, resulting in a residential BLE infrastructure, providing inter-device information and connectivity in an inobtrusive manner that a user of a given BLE-enabled device might be wholly unaware of.

Users are likely to far more aware of devices employing standard, non-LE Bluetooth are such as headphones, portable speakers, automobile entertainment/communication systems, and the computers and smart devices (phones, tablets, etc.) they are normally paired with. These non-LE Bluetooth devices are utilized by consumers with great regularity in most households and business environments. Consequently, they have become items which are used almost reflexively when engaging in a task or activity. For example, if a person wants to listen to music being streamed from a smartphone or tablet. This reflexive use can also lead to a very common problem—Bluetooth devices being misplaced. If a user uses them "everywhere" in a given environment, they can be "anywhere" when misplaced.

Although there are dongles and tags (many of which utilize BLE) that may be attached to particular devices that a consumer wishes to track or find, these can be expensive and often unsightly or even larger than the device they are attached to—It would seem rather inconvenient to attach a 50 mm×50 mm tracking device to a wireless headphone earbud. Some of the tracking dongles/tags require paid subscriptions to utilize all tracking features. Consequently, there exists a need for a simple, low-cost system and method to leverage a pre-existing infrastructure, such as one employing BLE, to provide a simple, consumer-friendly means of locating standard Bluetooth devices in a residential or business environment.

BRIEF SUMMARY OF THE INVENTION

A system and method for utilizing a network of Bluetooth devices to determine approximate location of Bluetooth device that was lost or misplaced in vicinity of the network. The network can be constructed from low-energy Bluetooth devices that would otherwise be only periodically active and/or networked for a purpose other than the localization of lost or misplaced devices.

BRIEF DESCRIPTION OF THE DRAWINGS

The aspects, and advantages of the present invention will become better understood with regard to the following description, appended claims, and accompanying drawings in which:

FIG. 2D provides a depiction of a second device location screen supported by the system of FIG. 1.

DETAILED DESCRIPTION

Figure 1:
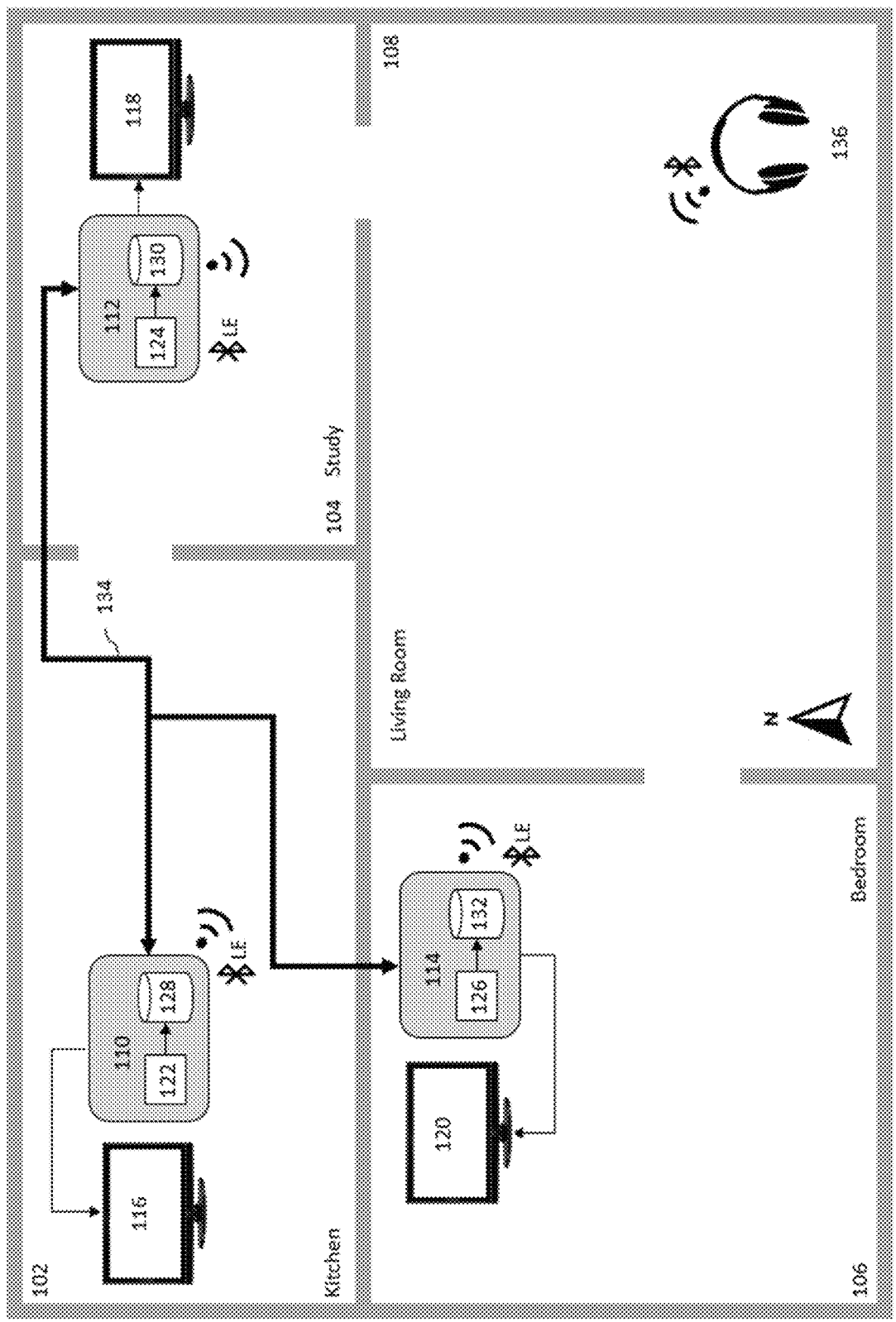
FIG. 1 provides a diagram of a residential environment in which a Bluetooth device location system in a first preferred embodiment of a BLE device location system is employed.

FIG. 1 is an overhead view of a residential environment comprised of four rooms (kitchen 102, study 104, bedroom 106 and living room 108) in which a preferred embodiment of a system for locating a Bluetooth device is deployed. As shown, in three of the four rooms there is a digital set-top box (110, 112 and 114) adapted to receive, process and display video programming on an associated screen (116, 118 and 120, respectively). Each digital set-top box (110, 112 and 114) includes a processor (122, 124 and 126, respectively) and an associated memory (128, 130 and 132, respectively). Each of these processors, utilizing information stored in the associated memory, serves to provide and control the various features and functions of the digital set-top box, including the user interface, video and audio processing, program tuning, network communication, etc. The digital set-top boxes are all interconnected via local network 134. Local Network 134 can be a an optical, a cable network, and ethernet network, a Wi-Fi network (such as those conforming to IEEE 802.11 or 802.15 standards), a local area network, a private network, etc. As indicated by the Bluetooth LE symbols, each of the cable boxes is also adapted to communicate with compatible devices via BLE.

The relative positions of each box could be readily calculated utilizing the processor(s) resident in a digital set-top box and a program or application utilizing Radio Signal Strength Information ("RSSI"), radio fingerprint mapping, angle of arrival sensing, and/or time of flight measurements of intra box communications. The derivation of device positioning from such data is well-known in the art and will not be discussed in detail here. Generally, the location of the digital set-top boxes within a residence or business is quite static. Once installed, users do not tend to move the boxes about with any great regularity. Consequently, the locations of set-top boxes 110, 112 and 114 form a relatively fixed constellation of devices, in which the relative positions of each digital set-top box are known.

Information indicative of the locations of all of the set-top boxes is stored in each of memories 128, 130 and 132. This information can be entered by one or more users via a graphical user interface ("GUI"), or automatically determined by each of the set-top boxes via one or more of the previously discussed radio signal measurement schemes, or through a different method such as global positioning system ("GPS") measurements.

A pair of Bluetooth-enabled headphones (136) located in room 108 is also shown in FIG. 1. In accordance with this first preferred embodiment, the pre-existing network of digital set-top boxes can be utilized to locate headphones 124. This is facilitated by at least one of the set-top processors having access to a device locating program stored within the associated memory. For purposes of providing a disclosure of the technology, assume that set-top 110 in room 102 has information representing such a program stored within memory 128 which is executable by processor 122. A user would access the program via a GUI upon display 110. FIG. 2 provides a depiction of such a GUI, offering a user access to Bluetooth device location functionality from a main menu (202) offering a number of set-top functions. As shown, a user has selected "Find a Bluetooth Device" from the main menu utilizing on-screen cursor 204. Such functionality could also be accessed via a dedicated button upon a remote control associated with set-top box 110.

Figure 2A:
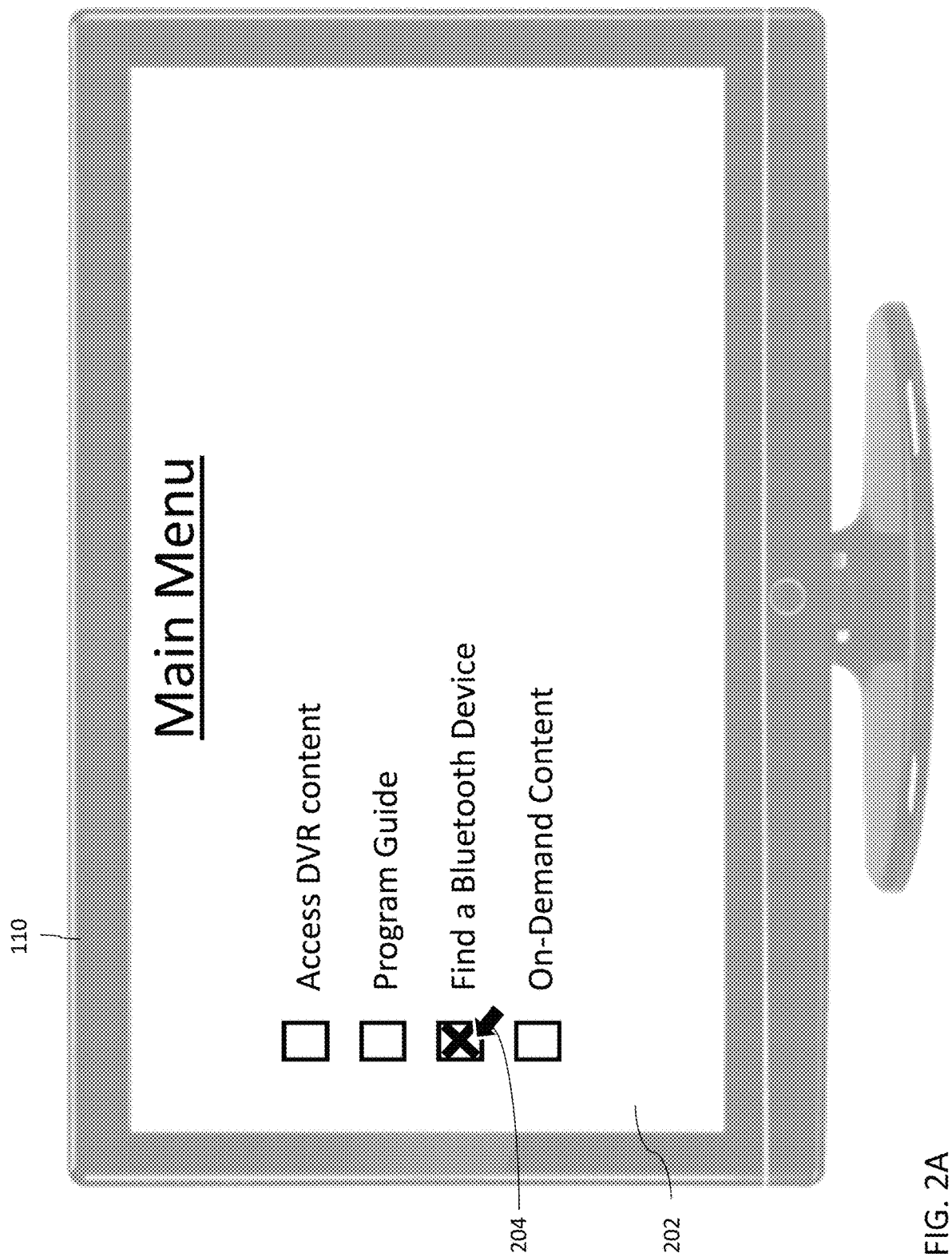
FIG. 2A provides a depiction of a main menu screen supported by the system of FIG. 1.
Figure 2B:
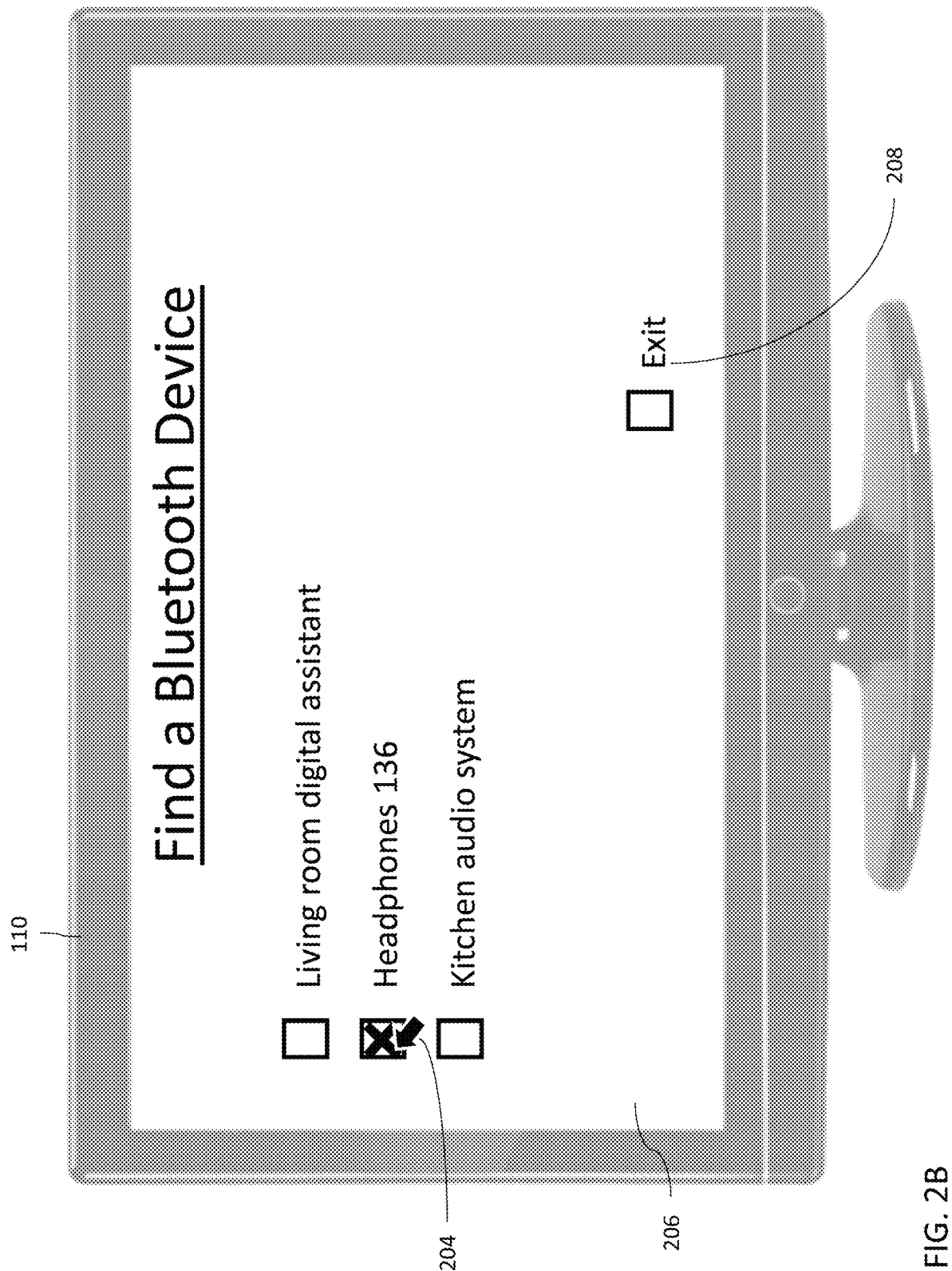
FIG. 2B provides a depiction of a device selection screen supported by the system of FIG. 1.
Figure 3:
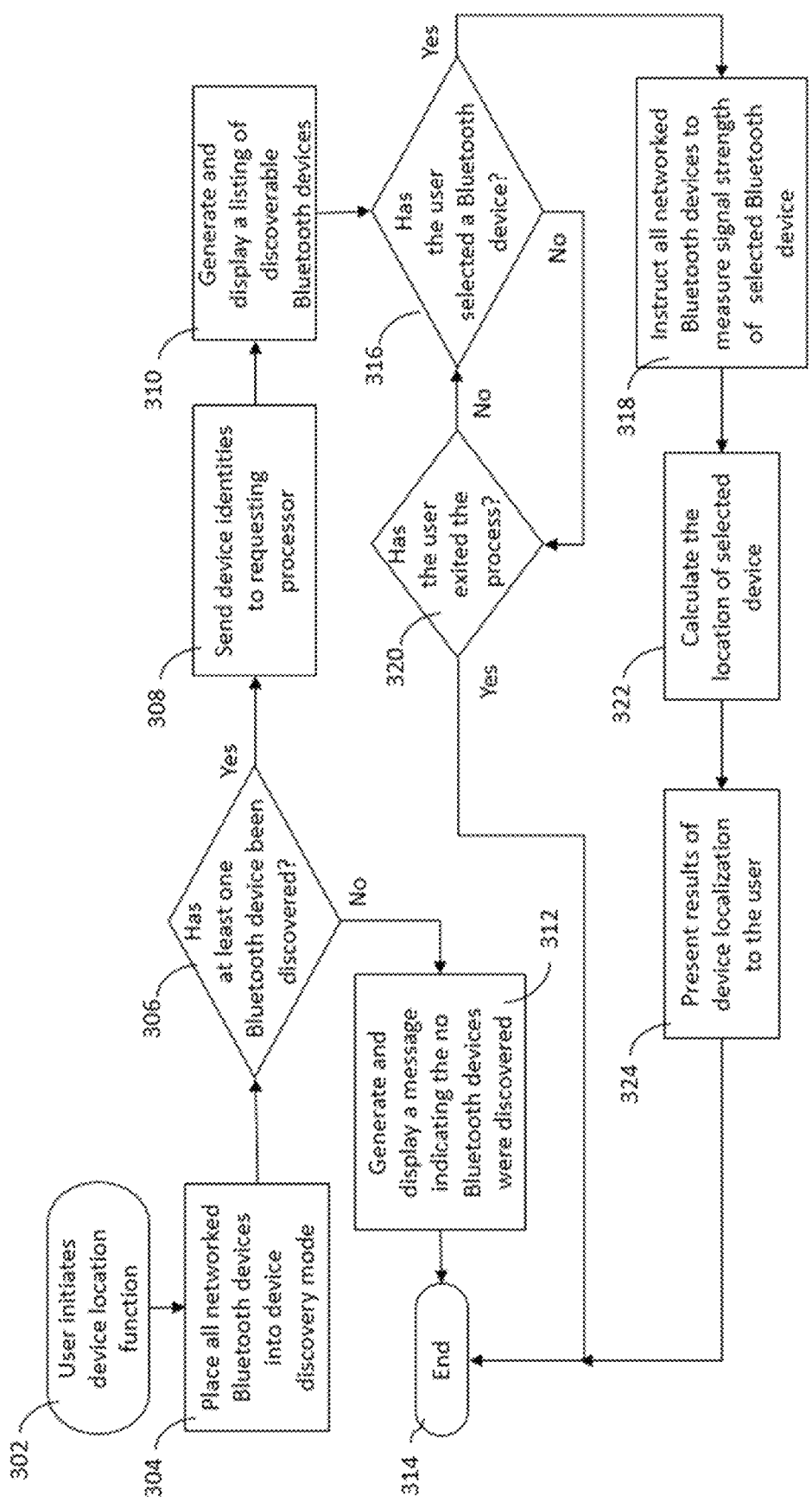
FIG. 3 is a flow diagram of a process supported by the system of FIG. 1.

In response to the users request to activate the "Find a Bluetooth Device" functionality, the networked set-top boxes (110, 112 and 114) are placed into a mode where each set-top box utilizes inherent Bluetooth functionality to find discoverable Bluetooth devices (see steps 302 and 304 of FIG. 3). Such device discovery functionality returns a list of all discoverable Bluetooth devices, as shown on screen 206 in FIG. 2B. The identities of all discoverable Bluetooth devices are forwarded to requesting processor 112 (see steps 306 and 308 of FIG. 3). Set-top box 110 then generates a screen listing all discoverable Bluetooth devices detected by any one of the three networked set-top boxes (step 310). As shown in FIG. 2B, the list includes a number of disparate Bluetooth devices: a living room digital assistant, a kitchen audio system, and headphones 136. As also shown, the user has utilized on-screen cursor 204 to indicate that headphones 136 is the device that needs to be located. If at step 316 no discoverable devices were found, the process would have continued with steps 312 and 314, wherein set-top box 110 would generated and display an on-screen message informing the user of such, and then terminate the process.

Upon the selection of a particular device to be located (headphones 136), processor 122 within set-top box 110, instructs each of the networked set-top boxes to determine the strength of the signal being received from headphones 136 (steps 316 and 318). If the user fails to find a device of interest in the listing, the process can be exited and terminated (see on-screen icon 208 in FIG. 2B, and steps 320 and 314 in FIG. 3). The value of the signal strength measured by each of the set-top boxes is returned to processor 122 for use in approximating the location of headphones 136. Utilizing the relative signal strengths, processor 122 employs a triangulation program (stored in memory 128) to calculate the approximate location of headphones 136 (step 322). The triangulated position of headphones 136 could be presented to the user in a number of formats (step 324).

Figure 2C:
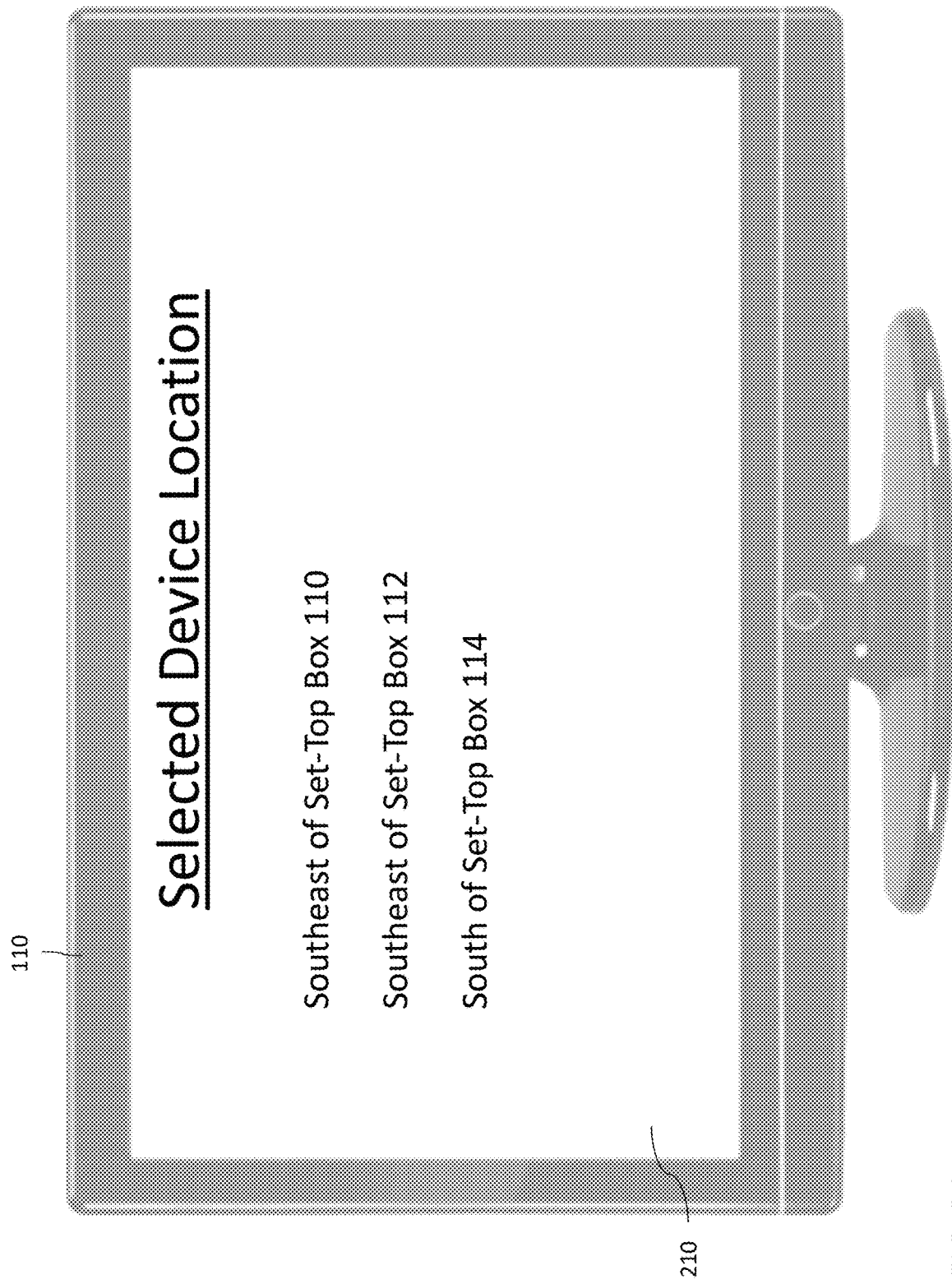
FIG. 2C provides a depiction of a first device location screen supported by the system of FIG. 1.

FIG. 2C depicts one such format wherein the position is expressed as a compass direction from each of the three set-top boxes (screen 210). Assuming the user had reasonably good sense of which direction north was, the location of headphones 136 within the residential environment could be could be approximated. This directional information could also be augmented with relative signal strength information (see screen 212 of FIG. 2D). This information could aid a user in approximating the relative distance between the various set-top boxes and the misplaced Bluetooth device.

Figure 2E:
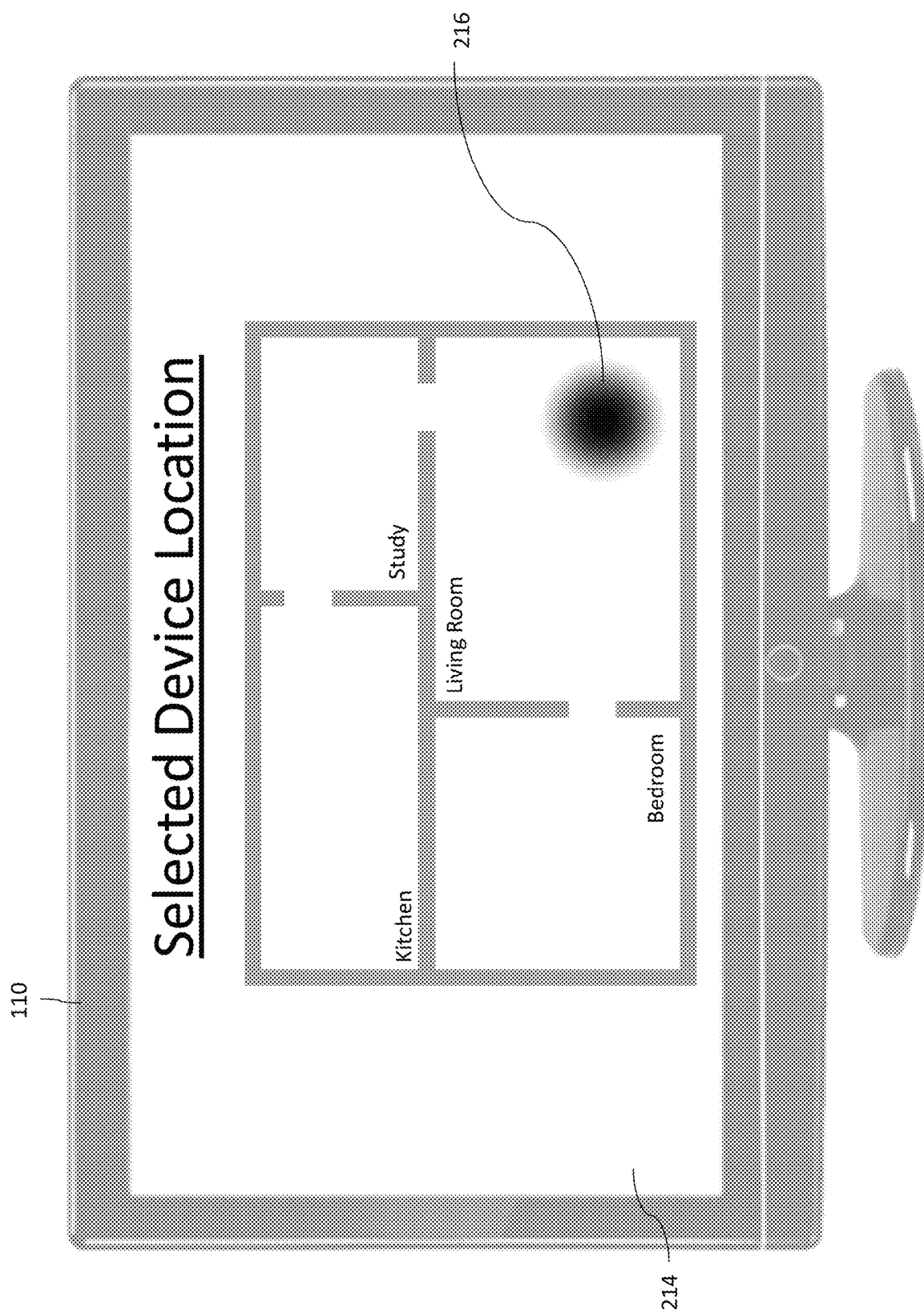
FIG. 2E provides a depiction of a third device location screen supported by the system of FIG. 1.
Figure 2F:
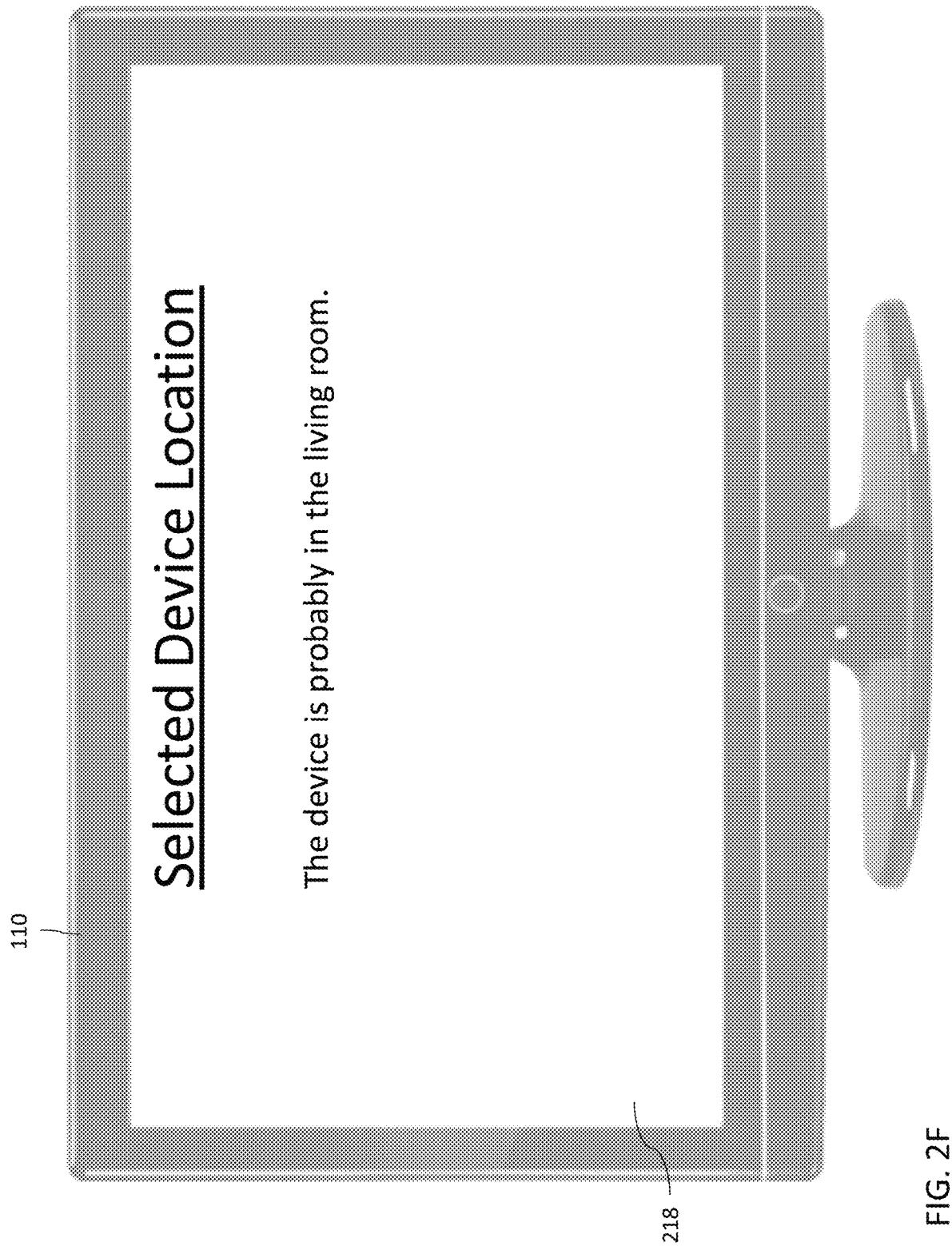
FIG. 2F provides a depiction of a fourth device location screen supported by the system of FIG. 1.

FIG. 2E provides an alternate screen (214) that could be generated by processor 122 within set-top box 110 as a means of providing a user with the approximate location of headphones 136. This display utilizes a depiction of the residential environment that had been previously provided by a user. This depiction could have been uploaded from a networked device such as a computer or smartphone, or created using a utility provided by one of the set-top boxes (110, 112, or 114). Utilizing the depiction, and the known locations of the three set-top boxes, processor 112 generates a graphical marker (216) indicative the approximate location of headphones 136 based upon the triangulation of the signal strengths received by the three set-top boxes.

A set-top box could also simply return the name of the room in which the misplaced Bluetooth device was most likely located. The device location would be calculated in the same manner as was done with respect to the display of FIG. 2E (predetermined mapping of the residential environment and the triangulation of received signal strengths). However, instead of generating a graphical representation of the device location, the display simply provides the name of room or rooms corresponding to the calculated position of the misplaced device (see screen 218 of FIG. 2F).

Although the invention herein has been described with reference to particular embodiments, it is to be understood that these embodiments are merely illustrative of the principles and applications of the present invention. For example, more or less than three devices that employ BLE technology could be utilized in collecting data to locate a misplaced or lost Bluetooth device. Three devices are the minimum number required for triangulation based upon signal strength measurements, but more than three could be utilized. In addition, tow devices could also be used to locate a Bluetooth device, based simply on relative signal strength. The estimate of the device position would be less specific, but it could be useable. The embodiment described above return localization results to the user via a screen associated with the set-top box from which request to locate the device was made. However, requests to locate a device could originate from a device other than a set-top box. For example, a device such as a tablet, smartphone or digital assistant linked to at least one BLE device in a network of BLE devices could serve as the interface for initiating a device localization and for receiving the results of such. The above described invention could also return the localization results to a user in an audible format, synthesizing a recitation of a devices location: "The headphones are located in the living room".

The devices utilized to obtain signal strength information are also not limited to BLE set-top boxes. Any BLE device (or other Bluetooth device) properly adapted to discover Bluetooth devices and measure their signal strength could be utilized as a component of a network to support device localization. Such devices include media gateway appliances, cable/satellite/optical modems, computers, tablets, smartphones, digital televisions, etc. It will also be understood that all or part of the above-described processing and storage associated with set-top box 110 could be performed in whole or in-part by an offsite server or processing means.

The type of discoverable Bluetooth device is also not limited to a set of headphones, as was used in the above preferred embodiment. The Bluetooth device could be any discoverable Bluetooth system, appliance or device. This includes headphones, headsets, ear buds, speakers, audio devices, remote control devices, Internet-of-Things ("IoT") device, lighting devices; styluses, pointing devices, keyboards, fitness trackers, home health care monitors, etc.

All of the above variations and reasonable extensions therefrom could be implemented and practiced without departing from the spirit and scope of the present invention as defined by the appended claims.

The invention claimed is:

1. A system for determining approximate location of at least one discoverable Bluetooth device, comprising:
    a plurality of Bluetooth Low Energy devices linked by a first network, each adapted, in response to a received activation command received via the first network, to recognize the at least one discoverable Bluetooth device, measure the signal strength received from the at least one discoverable Bluetooth devices, and transmit information indicative of the signal strength received from the at least one discoverable Bluetooth devices via the first network;
    at least one memory storing information indicative of the relative locations of each of the plurality of Bluetooth Low Energy devices; and
    at least one processor adapted to:
        retrieve the information indicative of the relative locations of each of the plurality of Bluetooth Low Energy devices from the at least one memory;
        transmit an activation command to the plurality of Bluetooth Low Energy devices;
        receive from each of the plurality of Bluetooth Low Energy devices, via the first network, the transmitted information indicative of the signal strength received from each of the discoverable Bluetooth devices; and
        calculate the location of the at least one discoverable Bluetooth device based, at least in part, upon the signal strength received from each of the discoverable Bluetooth devices and the information indicative of the relative locations of each of the plurality of Bluetooth Low Energy devices.

2. The system of claim 1 wherein the first network comprises at least one of the following:
    a cable network;
    an optical network;
    an ethernet network;
    a Wi-Fi network;
    a local area network; and
    a private network.

3. The system of claim 1 wherein at least one of the plurality of Bluetooth Low Energy devices comprises at least one of the following:
    a media gateway appliance;
    a router;
    a digital television;
    a cable modem;
    a satellite modem;
    an optical modem
    a computer
    a tablet
    a smartphone; and
    a digital assistant.

4. The system of claim 1 wherein the at least one discoverable Bluetooth device comprises at least one of the following:
    a pair of headphones;
    a headset;
    an ear bud;
    a speaker;
    an audio device;
    a remote-control device;
    a lighting device;
    a stylus;
    a pointing device;
    an Internet-of-Things device;
    a keyboard;
    a fitness tracker; and
    a home health care monitor.

5. The system of claim 1 further comprising:
    at least one display adapted to provide information indicative of the calculated location of the at least one discoverable Bluetooth device.

6. The system of claim 5, further comprising a plurality of discoverable Bluetooth devices, and wherein the at least one processor is further adapted to:
    compile a list of the plurality of discoverable devices;
    display the compiled list upon the at least one display;
    respond to a user command to select one of the displayed discoverable Bluetooth devices; and
    calculate the location of the selected discoverable Bluetooth device based, at least in part, upon the signal strength received from the selected discoverable Bluetooth devices and the information indicative of the relative locations of each of the plurality of Bluetooth Low Energy devices.

7. The system of claim 5 wherein the information indicative of the calculated location comprises a graphical representation of a premises in which the at least one discoverable Bluetooth device is located.

8. The system of claim 7 wherein graphical representation further comprises a graphical representation of the location of the at least one discoverable Bluetooth device situated within the premises.

9. The system of claim 5 wherein the information indicative of the calculated location of the at least one discoverable Bluetooth device comprises at least one of the following:
    a graphical representation of the calculated location;
    a directional description of the calculated location;
    a representation of the signal strength received from each of the discoverable Bluetooth devices; and
    the name of the calculated location.

10. The system of claim 9 wherein the name of the calculated location comprises a room within a premises in which the at least one discoverable Bluetooth device is located.

11. A method for determining approximate location of at least one discoverable Bluetooth device, in a system comprising:
    a plurality of Bluetooth Low Energy devices linked by a first network, each adapted, in response to a received activation command received via the first network, to recognize the at least one discoverable Bluetooth device, measure the signal strength received from the at least one discoverable Bluetooth devices, and transmit information indicative of the signal strength received from the at least one discoverable Bluetooth devices via the first network; and
    at least one memory storing information indicative of the relative locations of each of the plurality of Bluetooth Low Energy devices;
    the method comprising the steps of:
        retrieving the information indicative of the relative locations of each of the plurality of Bluetooth Low Energy devices from the at least one memory;

transmitting an activation command to the plurality of Bluetooth Low Energy devices;

receiving from each of the plurality of Bluetooth Low Energy devices, via the first network, the transmitted information indicative of the signal strength received from each of the discoverable Bluetooth devices; and calculating the location of the at least one discoverable Bluetooth device based, at least in part, upon the signal strength received from each of the discoverable Bluetooth devices and the information indicative of the relative locations of each of the plurality of Bluetooth Low Energy devices.

12. The method of claim 11 wherein the first network comprises at least one of the following:
a cable network;
an optical network;
an ethernet network;
a Wi-Fi network;
a local area network; and
a private network.

13. The method of claim 11 wherein at least one of the plurality of Bluetooth Low Energy devices comprises at least one of the following:
a media gateway appliance;
a router;
a digital television;
a cable modem;
a satellite modem;
an optical modem
a computer
a tablet
a smartphone; and
a digital assistant.

14. The method of claim 11 wherein the at least one discoverable Bluetooth device comprises at least one of the following:
a pair of headphones;
a headset;
an ear bud;
a speaker;
an audio device;
a remote-control device;
a lighting device;
a stylus;
a pointing device;
an Internet-of-Things device;
a keyboard;
a fitness tracker; and
a home health care monitor.

15. The method of claim 11 wherein the system further comprises at least one display adapted to provide information indicative of the calculated location of the at least one discoverable Bluetooth device.

16. The method of claim 15, wherein the system further comprises a plurality of discoverable Bluetooth devices, and wherein the method further comprises the steps of:
compiling a list of the plurality of discoverable devices;
displaying the compiled list upon the at least one display;
responding to a user command to select one of the displayed discoverable Bluetooth devices; and
calculating the location of the selected discoverable Bluetooth device based, at least in part, upon the signal strength received from the selected discoverable Bluetooth devices and the information indicative of the relative locations of each of the plurality of Bluetooth Low Energy devices.

17. The method of claim 15 wherein the information indicative of the calculated location comprises a graphical representation of a premises in which the at least one discoverable Bluetooth device is located.

18. The method of claim 17 wherein graphical representation further comprises a graphical representation of the location of the at least one discoverable Bluetooth device situated within the premises.

19. The method of claim 15 wherein the information indicative of the calculated location of the at least one discoverable Bluetooth device comprises at least one of the following:
a graphical representation of the calculated location;
a directional description of the calculated location;
a representation of the signal strength received from each of the discoverable Bluetooth devices; and
the name of the calculated location.

20. The method of claim 19 wherein the name of the calculated location comprises a room within a premises in which the at least one discoverable Bluetooth device is located.

* * * * *